US006715695B2

(12) United States Patent
Lorraine

(10) Patent No.: US 6,715,695 B2
(45) Date of Patent: Apr. 6, 2004

(54) PRESSURE RESPONSIVE VALVE FOR A COMPENSATOR IN A SOLID STATE ACTUATOR

(75) Inventor: Jack Lorraine, Harrisburg, PA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 58 days.

(21) Appl. No.: 09/973,937

(22) Filed: Oct. 11, 2001

(65) Prior Publication Data

US 2002/0047100 A1 Apr. 25, 2002

Related U.S. Application Data

(60) Provisional application No. 60/239,290, filed on Oct. 11, 2000.

(51) Int. Cl.[7] ................................................ F16K 31/02

(52) U.S. Cl. .............................. 239/102.2; 251/129.06; 251/129.18

(58) Field of Search ....................... 251/129.18, 129.06, 251/129.15; 239/102.2

(56) References Cited

U.S. PATENT DOCUMENTS

| | | | | |
|---|---|---|---|---|
| 3,753,426 A | | 8/1973 | Lilley | 123/139 E |
| 4,499,878 A | | 2/1985 | Igashira et al. | 123/478 |
| 4,529,164 A | | 7/1985 | Igashira et al. | 251/129 |
| 4,550,744 A | | 11/1985 | Igashira et al. | 137/80 |
| 4,553,059 A | | 11/1985 | Abe et al. | 310/328 |
| 4,584,980 A | | 4/1986 | Weiger et al. | 123/458 |
| 4,608,958 A | | 9/1986 | Sakakibara et al. | 123/605 |
| 4,649,886 A | | 3/1987 | Igashira et al. | 123/498 |
| 4,725,002 A | * | 2/1988 | Trachte | 239/102.2 |
| 4,735,185 A | | 4/1988 | Imoto et al. | 123/498 |
| 4,750,706 A | * | 6/1988 | Schlagmuller | 251/129.06 |
| 5,036,821 A | | 8/1991 | Horiuchi et al. | 123/506 |
| 5,080,079 A | | 1/1992 | Yoshida et al. | 123/531 |
| 5,176,122 A | | 1/1993 | Ito | 123/478 |
| 5,548,263 A | * | 8/1996 | Bulgatz et al. | 251/129.18 |
| 5,605,134 A | | 2/1997 | Martin | 123/467 |

(List continued on next page.)

FOREIGN PATENT DOCUMENTS

| | | |
|---|---|---|
| DE | 197 27 992 | 1/1999 |
| DE | 198 38 862 | 3/2000 |
| DE | 198 54 506 | 4/2000 |
| DE | 198 58 476 | 6/2000 |
| EP | 0 869 278 | 10/1998 |

OTHER PUBLICATIONS

PCT/US01/31847; International Search Report, Feb. 20, 2002.

(List continued on next page.)

*Primary Examiner*—John Bastianelli

(57) ABSTRACT

A fuel injector comprises a body having a longitudinal axis, a length-changin solid state actuator that has first and second ends, a closure member coupled to the first end of the solid state actuator, and a compensator assembly coupled the second end of the solid state actuator. The solid state actuator includes a plurality of solid state elements along the axis between the first and second ends. The closure member is movable between a first configuration permitting fuel injection and a second configuration preventing fuel injection. And the compensator assembly axially positions the solid state actuator with respect to the body in response to temperature variation. The compensator assembly utilizes a configuration of at least one spring disposed between two pistons so as to reduce the use of elastomer seals to thereby reduce a slip stick effect. Also, a method of compensating for thermal expansion or contraction of the fuel injector comprises providing fuel from a fuel supply to the fuel injector; and adjusting the solid state actuator with respect to the body in response to temperature variation.

16 Claims, 2 Drawing Sheets

U.S. PATENT DOCUMENTS

| | | | | | |
|---|---|---|---|---|---|
| 5,647,311 | A | * | 7/1997 | Liang et al. | 251/129.18 |
| 5,779,149 | A | | 7/1998 | Hayes, Jr. | 239/124 |
| 5,810,255 | A | | 9/1998 | Itoh et al. | 239/102.2 |
| 6,006,720 | A | | 12/1999 | Yanagihara et al. | 123/305 |
| 6,047,673 | A | * | 4/2000 | Lohse et al. | 251/129.18 |
| 6,047,948 | A | * | 4/2000 | Hasegawa et al. | 251/129.18 |
| 6,062,533 | A | | 5/2000 | Kappel et al. | 251/57 |
| 6,070,853 | A | * | 6/2000 | Stolk et al. | 251/129.18 |
| 6,142,443 | A | | 11/2000 | Potschin et al. | 251/57 |
| 6,148,842 | A | * | 11/2000 | Kappel et al. | 251/129.06 |
| 6,155,532 | A | * | 12/2000 | Heinz et al. | 251/129.06 |
| 6,168,133 | B1 | | 1/2001 | Heinz et al. | 251/57 |
| 6,213,414 | B1 | | 4/2001 | Stier et al. | 239/584 |
| 6,260,541 | B1 | | 7/2001 | Ricci-Ottati et al. | 123/498 |
| 6,313,568 | B1 | * | 11/2001 | Sullivan et al. | 310/346 |

OTHER PUBLICATIONS

U.S. patent application Ser. No. 09/973,934, Lorraine et al., filed Oct. 11, 2001, pending.

U.S. patent application Ser. No. 09/973,939, Lorraine et al., filed Oct. 11, 2001, pending.

U.S. patent application Ser. No. 09/973,933, Lorraine et al., filed Oct. 11, 2001, pending.

U.S. patent application Ser. No. 09/973,938, Lorraine et al., filed Oct. 11, 2001, pending.

* cited by examiner

PRESSURE RESPONSIVE VALVE FOR A COMPENSATOR IN A SOLID STATE ACTUATOR

PRIORITY

This application claims the benefits of provisional application Ser. No. 60/239,290 filed on Oct. 11, 2000, which is hereby incorporated by reference in its entirety in this application.

FIELD OF THE INVENTION

The invention generally relates to length-changing actuators such as a magnetorestrictive or length-changing solid state actuator. In particular, the present invention relates to a compensator assembly for a length-changing actuator, and more particularly to an apparatus and method for hydraulically compensating a solid state actuated high-pressure fuel injector for internal combustion engines.

BACKGROUND OF THE INVENTION

Solid-state actuator such as a length-changing actuator may include a ceramic structure whose axial length can change through the application of an operating voltage. It is believed that in typical applications, the axial length can change by, for example, approximately 0.12%. In a stacked configuration, it is believed that the change in the axial length is magnified as a function of the number of actuators in the length-changing actuator stack. Because of the nature of the length-changing actuator, it is believed that a voltage application results in an instantaneous expansion of the actuator and an instantaneous movement of any structure connected to the actuator. In the field of automotive technology, especially, in internal combustion engines, it is believed that there is a need for the precise opening and closing of an injector valve element for optimizing the spray and combustion of fuel. Therefore, in internal combustion engines, length-changing actuators are now employed for the precise opening and closing of the injector valve element.

During operation, components of an internal combustion engine experience significant thermal fluctuations that result in the thermal expansion or contraction of the engine components. For example, it is believed that a fuel injector assembly includes a valve body that may expand during operation due to the heat generated by the engine. Moreover, it is believed that a valve element operating within the valve body may contract due to contact with relatively cold fuel. If a length-changing actuator stack is used for the opening and closing of an injector valve element, it is believed that the thermal fluctuations can result in valve element movements that can be characterized as an insufficient opening stroke, or an insufficient sealing stroke. It is believed that this is because of the low thermal expansion characteristics of the length-changing actuator as compared to the thermal expansion characteristics of other fuel injector or engine components. For example, it is believed that a difference in thermal expansion of the housing and actuator stack can be more than the stroke of the actuator stack. Therefore, it is believed that any contractions or expansions of a valve element can have a significant effect on fuel injector operation It is believed that there is a need to provide thermal compensation that overcomes the drawbacks of conventional methods.

SUMMARY OF THE INVENTION

The present invention provides a fuel injector that utilizes a length-changing actuator, such as, for example, an electrorestrictive, magnetorestrictive or a solid-state actuator with a compensator assembly that compensates for thermal distortions, brinelling, wear and mounting distortions. The compensator assembly utilizes a minimal number of elastomer seals so as to reduce a slip stick effect of such seals while achieving a more compact configuration for a compensator assembly. In one preferred embodiment of the invention, the fuel injector comprises a housing having a first housing end and a second housing end extending along a longitudinal axis, the housing having an end member disposed between the first and second housing ends; a length-changing solid state actuator disposed along the longitudinal axis. A closure member coupled to the length-changing actuator, the closure member being movable between a first configuration permitting fuel injection and a second configuration preventing fuel injection, and a compensator assembly that moves the length-changing actuator with respect to the housing in response to temperature changes. The compensator assembly includes a body. The body includes an interior surface defining a first fluid reservoir and a second fluid reservoir that are disposed between a first body end and a second body end, a valve spacer disposed between the first fluid reservoir and the second fluid reservoir. The valve spacer has a first spacer face and a second spacer face, and a plate contiguous to one of the first and second faces. The plate is responsive to one of a first fluid pressure in the first fluid reservoir and a second fluid pressure in the second reservoir so as to permit fluid flow from one of the first and second fluid reservoirs to the other of the first and second fluid reservoirs.

The present invention provides a compensator that can be used in a length-changing actuator, such as, for example, an electrorestrictive, magnetorestrictive or a solid-state actuator so as to compensate for thermal distortion, wear, brinelling and mounting distortion of an actuator that the compensator is coupled to. In a preferred embodiment, the length-changing actuator has first and second ends. The compensator assembly includes a body having a first body end and a second body end extending along a longitudinal axis. The body has a body inner surface facing the longitudinal axis, a first piston disposed in the body proximate one of the first body end and second body end, the first piston including a first face having a first surface area, a first sealing member coupled to the first piston and contiguous to the body inner surface, a second piston disposed in the body distal to the first piston, the second piston including a second face having a second surface area, a second sealing member coupled to the second piston and contiguous to the body inner surface, a spacer disposed between the first piston and the second piston in the body. The spacer has a first spacer end and a second spacer end in fluid communication with one another, the first spacer end being disposed in a confronting arrangement to one of the first face and second face so as to define a first fluid reservoir within the body, the second spacer end being disposed in a confronting arrangement to the other of the first face and the second face so as to define a second fluid reservoir within the body. A valve is disposed in one of the first and second reservoir, the valve being responsive to one of a first fluid pressure in the first fluid reservoir and a second fluid pressure in the second reservoir so as to permit fluid flow from one of the first and second fluid reservoirs to the other of the first and second fluid reservoirs.

The present invention further provides a method of compensating for distortion of a fuel injector due to thermal distortion, brinelling, wear and mounting distortion. The fuel injector includes a housing having a first housing end and a second housing end extending along a longitudinal axis, the housing having an end member disposed between the first and second housing ends, an length-changing actuator disposed along the longitudinal axis, a closure member coupled to the length-changing actuator, the closure member being movable between a first configuration permitting fuel injection and a second configuration preventing fuel injection, and a compensator assembly that moves the length-changing actuator with respect to the body in response to temperature changes. The compensator assembly includes a body having a first body end and a second body end extending along a longitudinal axis. The body has a body inner surface facing the longitudinal axis, a first piston disposed in the body proximate one of the first body end and second body end, the first piston including a first face having a first surface area, a first sealing member coupled to the first piston and contiguous to the body inner surface, a second piston disposed in the body distal to the first piston, the second piston including a second face having a second surface area, a second sealing member coupled to the second piston and contiguous to the body inner surface, a spacer disposed between the first piston and the second piston in the body. The spacer has a first spacer end and a second spacer end in fluid communication with one another, the first spacer end being disposed in a confronting arrangement to one of the first face and second face so as to define a first fluid reservoir within the body, the second spacer end being disposed in a confronting arrangement to the other of the first face and the second face so as to define a second fluid reservoir within the body. A valve is disposed in one of the first and second reservoir, the valve being responsive to one of a first fluid pressure in the first fluid reservoir and a second fluid pressure in the second reservoir so as to permit fluid flow from one of the first and second fluid reservoirs to the other of the first and second fluid reservoirs. In a preferred embodiment, the method is achieved by containing a predetermined amount of hydraulic fluid in the first and second fluid reservoirs; pressurizing the hydraulic fluid in at least one of the first and second fluid reservoirs so as to displace the first piston; and preventing communication of hydraulic fluid between the first and second fluid reservoirs during activation of the length changing actuator.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENTS

Figure 1:
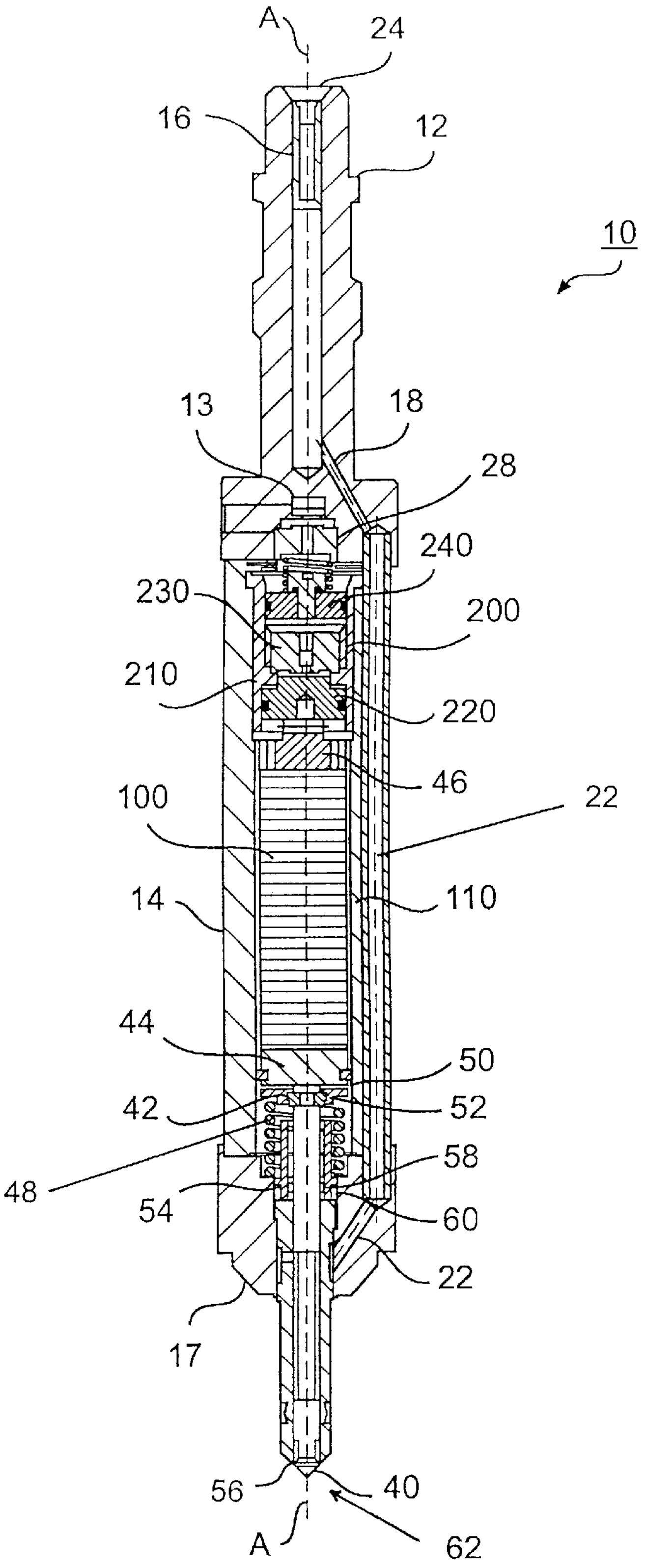
FIG. 1 is a cross-sectional view of a fuel injector assembly having a length-changing actuator stack and a compensator unit of a preferred embodiment.
Figure 2:
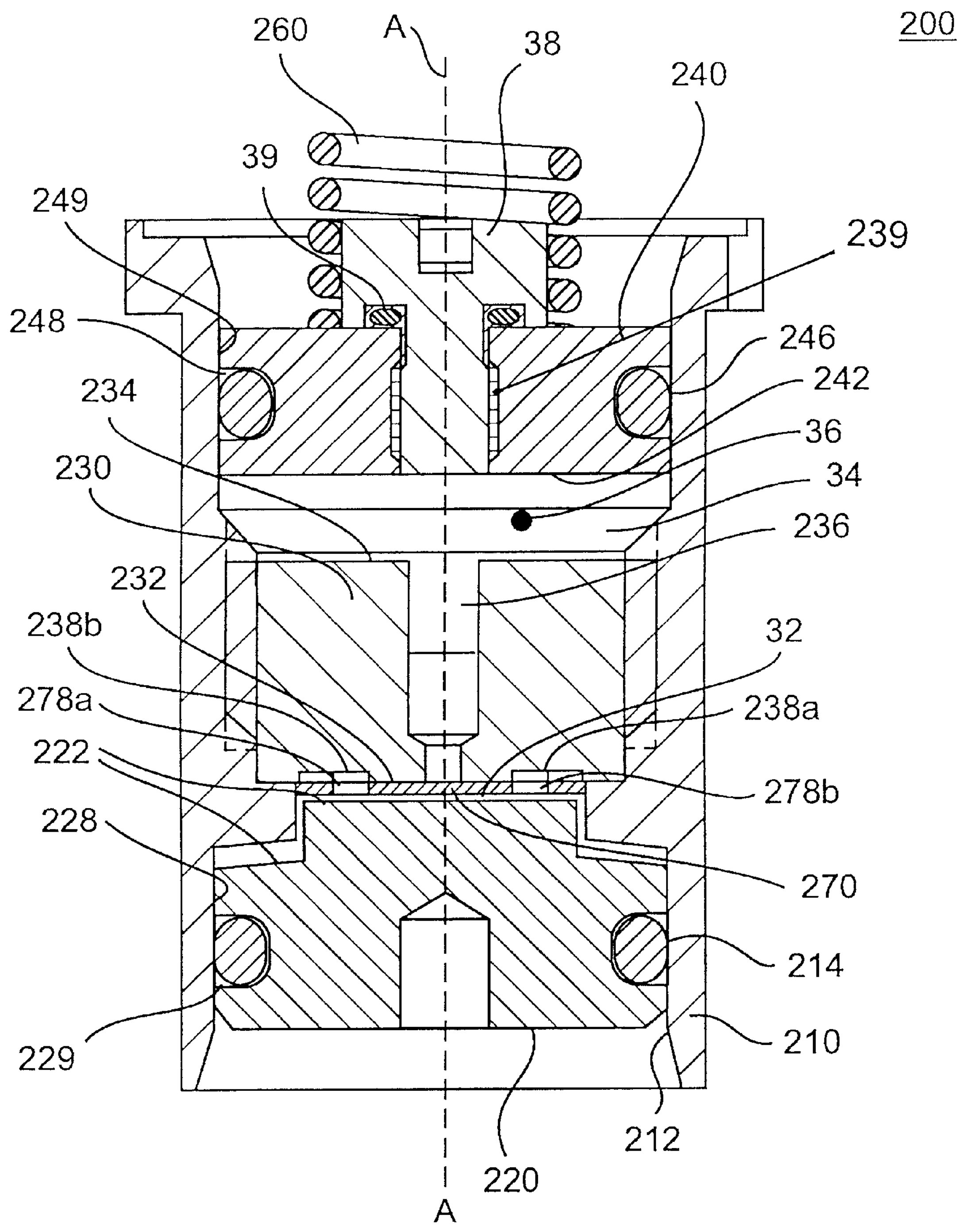
FIG. 2 is an enlarged view of the compensator assembly in FIG. 1.

Referring to FIGS. 1–2, a preferred embodiment is shown. FIG. 1 illustrates a preferred embodiment of a fuel injector assembly 10 having a length-changing actuator stack 100 and a compensator assembly 200. The fuel injector assembly 10 includes inlet-fitting 12, spring preload adjuster 13, injector housing 14, and valve body 16. The inlet fitting 12 includes a fuel filter 11, fuel passageways 18, 20 and 22, and a fuel inlet 24 connected to a fuel source (not shown). The inlet fitting 12 also includes an inlet end member 28 coupled to threaded adjuster 13. The compensator 200 has two fluid reservoirs that are filled with fluid 36. The fluid 36 can be a substantially incompressible fluid that is responsive to temperature change by changing its volume. Preferably, the fluid 36 is either silicon or other types of fluid that has a higher coefficient of thermal expansion than that of the injector inlet fitting 12, the housing 14 or other components of the fuel injector.

In the preferred embodiment, injector housing 14 encloses the length-changing actuator stack 100 and the compensator assembly 200. Valve body 16 is fixedly connected to injector housing 14 and encloses a valve closure member 40. The length-changing actuator stack 100 includes a plurality of length-changing elements that can be operated through contact pins (not shown) that are electrically connected to a voltage source. When a voltage is applied between the contact pins (not shown), the length-changing actuator stack 100 expands in a lengthwise direction. A typical expansion of the length-changing actuator stack 100, under load, may be on the order of approximately 30–50 microns, for example. The lengthwise expansion can be utilized for operating the injection valve closure member 40 for the fuel injector assembly 100.

Length-changing actuator stack 100 is guided along housing 14 by means of guides 110. The length-changing actuator stack 100 has a first end in operative contact with a closure end 42 of the valve closure member 40 by means of bottom 44, and a second end of the actuator stack 100 that is operatively connected to compensator assembly 200 by means of a top 46.

Fuel injector assembly 100 further includes a spring 48, a spring washer 50, a keeper 52, a bushing 54, a valve closure member seat 56, a bellows 58, and an O-ring 60. O-ring 60 is preferably a fuel compatible O-ring that remains operational at low ambient temperatures (−40 C or less) and at operating temperatures (140 C or more).

Referring to FIG. 2, compensator assembly 200 includes a body 210 encasing a first piston 220, a valve spacer portion 230, a second piston 240, and an elastic member or spring 260. The body 210 can be of any suitable cross-sectional shape that provides a mating fit with the first and second pistons, such as, for example, oval, square, rectangular or any suitable polygons. Preferably, the cross section of the body is circular, thereby forming a cylindrical body.

First piston 220 has a first face 222, which is disposed in a confronting arrangement with the valve spacer portion 230 so as to define a first fluid reservoir 32. The first face 222 can be conical, frustoconical or, preferably, a planar surface that has a first surface area.

An outer peripheral surface 228 of the first piston 220 is dimensioned so as to form a close tolerance fit with a body inner surface 212. The first piston includes a sealing member, preferably an elastomer 214 disposed in a groove 229 on the outer circumference of the second piston 240 so as to generally prevent leakage of fluid 36. Preferably, the elastomer 214 is an O-ring. Alternatively, the elastomer 214 can be an O-ring of the type having non-circular cross-sections. Other types of elastomer seals can also be used, such as, for example, a labyrinth seal. Additionally, a groove could be formed on the body inner surface 212 instead of on the outer peripheral surface 228.

The valve spacer portion 230 includes a first spacer face 232, a second spacer face 234, a flow passage 236 connected to a restrictor passage 237 that allows fluid communication between the first fluid reservoir and the second fluid reservoir 34. Although the restrictor 237 is employed in a preferred embodiment to reduce fluid pressure of fluid flowing to the first fluid reservoir, the restrictor 237 can be eliminated by extending the passage 236 along the whole length of the spacer 230.

The first spacer face 232 has a plurality of pockets or channels 238*a*, 238*b* formed on a surface that is preferably transverse with respect to the longitudinal axis A—A. The pockets or channels can be of a suitable shape, such as, for example, a cylinder, a square or a rectangle. Preferably, the pockets or channels 238*a* and 238*a* are cylindrical in shape.

The spacer 230 can be coupled to the body by a suitable coupling such as, for example, a spline coupling. In one preferred embodiment, the spacer 230 and the inner surface 249 of the body 210 is provided with complementary threads formed thereon so as to permit the spacer to be threaded to the body. Also preferably, there are twelve pockets or channels formed on the first spacer face 232.

A second piston 240 includes a second face 242 that is disposed in a confronting arrangement with the second spacer face 234 so as to define a second fluid reservoir 34. The second face 242 can be a conical, frustoconical or preferably, a planar surface with a second surface area that is approximately the same as the first surface area of the first piston. The second piston 240 also includes a sealing member, preferably an elastomer 246 disposed in a groove 248 on the outer circumference of the second piston 240 so as to generally prevent leakage of fluid 36 from the second fluid reservoir 34. Preferably, the elastomer 246 is an O-ring. Alternatively, the elastomer 246 can be an O-ring of the type having non-circular cross-sections. Other types of elastomer seals can also be used, such as, for example, a labyrinth seal. Alternatively, a groove can also be formed in the body inner surface 212 with a sealing member disposed therein.

A spring member 260 biases the second piston 240 towards the outlet end of the injector. The piston 240 is coupled to a filler plug 38 that allows fluid 36 to be introduced into the body 210. Preferably, the filler plug 38 is coupled to the piston 220 by complementary helical threads 239 formed on the second piston 240 and the filler plug 38.

A pressure sensitive valve is disposed in the first fluid reservoir 32 that allows fluid flow in one direction, depending on the pressure drop across the pressure sensitive valve. The pressure sensitive valve can be, for example, a check valve or a one-way valve. Preferably, the pressure sensitive valve is a flexible thin-disc plate 270 having a smooth surface disposed confronting the first face 222.

The plate 270 is disposed between the spacer 230 and a boss portion 311. The Plate 270 can be affixed to the face 232 of the spacer 230 by a suitable coupling, such as, for example, bonding, crimping, spot-welding or laser welding. Preferably, the face 232 of spacer 230 is used to retain the plate 270 between the face 232 and a boss portion 311 of the body 210 by threading the spacer 230 into the body 210 so as to retain the plate 270.

Referring to the plate 270, by having a smooth surface on the side contiguous to the first piston 220 that forms a sealing surface with the first spacer face 232, the plate 270 functions as a pressure sensitive valve that allows fluid to flow between a first fluid reservoir 32 and a second fluid reservoir 34 whenever pressure in the first fluid reservoir 32 is less than pressure in the second reservoir 34. That is, whenever there is a pressure differential between the reservoirs, the smooth surface of the plate 270 is lifted up to allow fluid to flow to the channels or pockets 238*a*, 238*b*. It should be noted here that the plate forms a seal to prevent flow as a function of the pressure differential instead of a combination of fluid pressure and spring force (as in a ball type check valve) in order to maintain a check valve closed against flow. The pressure sensitive valve or plate 270 includes orifices 278*a* and 278*b* formed through its surface. The orifice can be, for example, square, circular or any suitable through orifice. Preferably, there are twelve orifices formed in the plate with each orifice having a diameter of approximately 1.0 millimeter. Also preferably, each of the channels or pockets 238*a*, 238*b* has an opening that is approximately the same shape and cross-section as each of the orifices 278*a* and 278*b*.

Because the plate 270 has very low mass and is flexible, it responds very quickly with the incoming fluid by lifting up towards the first piston 220 so that fluid that has not passed through the plate adds to the volume of the hydraulic shim. The plate 270, in the open position (not shown), approximates a portion of a spherical shape as it pulls in a volume of fluid that is still under the plate 270 and in the passage 236. This additional volume is then added to the shim volume but whose additional volume is still on the first reservoir side of the sealing surface. One of the many benefits of the plate 270 is that pressure pulsations are quickly damped by the additional volume of hydraulic fluid that is added to the hydraulic shim in the first reservoir. This is because activation of the injector is a very dynamic event and the transition between inactive, active and inactive creates inertia forces that produce pressure fluctuations in the hydraulic shim. The hydraulic shim, because it has free flow in and restricted flow out of the hydraulic fluid, quickly dampens the oscillations.

The through hole or orifice diameter of the orifice 278*a* or 278*b* can be thought of as the effective orifice diameter of the plate instead of the lift height of the plate 270 because the plate 270 approximates a portion of a spherical shape as it lifts away from the first spacer face 232. Moreover, the number of orifices and the diameter of each orifice determine the stiffness of the plate 270, which is critical to a determination of the pressure drop across the plate 270. Preferably, the pressure drop should be small as compared to the pressure pulsations in the first reservoir 32 of the compensator. When the plate 270 has lifted approximately 0.1 mm, the plate 270 can be assumed to be wide open, thereby giving unrestricted flow into the first reservoir 32. The ability to allow unrestricted flow into the hydraulic shim prevents a significant pressure drop in the fluid. This is believed to be important because when there is a significant pressure drop, the gas dissolved in the fluid comes out, forming bubbles. This is due to the vapor pressure of the gas exceeding the reduced fluid pressure (i.e., certain types of fluid take on air like a sponge takes on water, thus, making the fluid behave like a compressible fluid.) The bubbles formed act like little springs making the compensator "soft" or "spongy". Once formed, it is difficult for these bubbles to re-dissolve into the fluid. The compensator, preferably by design, operates between approximately 2 and 7 bars of pressure, and it is believed that the hydraulic shim pressure does not drop significantly below atmospheric pressure. Thus, degassing of the fluid and compensator passages is not as critical as it would be without the plate 270. Preferably, the thickness of the plate 270 is approximately 0.1 millimeter and its surface area is approximately 88 millimeter squared ($mm^2$). Furthermore, to maintain a desired flexibility of the plate 270, it is preferable to have an array of approximately twelve orifices, each orifice having an opening of approximately 0.8 millimeter squared ($mm^2$), and the thickness of the plate is preferably the result of the square root of the surface area divided by approximately 94.

The spring 260 can react against the threaded adjuster 13 (and also end member 28) to push the second piston 240 towards the outlet of the injector. The spring force causes a pressure increase in the fluid 36 that acts against the second face 242 of the second piston 240. In an initial condition, hydraulic fluid 36 is pressurized as a function of the spring force of the spring 260 and the second surface area of the second face 242. The pressurized fluid tends to flow into and out of the first reservoir 32 and the second reservoir 34 when the pressure in the first fluid reservoir is less than the pressure in the second reservoir. Where the pressure in the first reservoir 32 is lower than the second reservoir 34, such as in an initial condition, the flapper or plate 270 operates to permit fluid 36 to flow into the first reservoir 32. The fluid 36 that forms a hydraulic shim in the first reservoir 32 tends to expand due to an increase in temperature in and around the compensator. Prior to any expansion of the fluid in the first reservoir 32, the first reservoir is preloaded by the second face 242 and the spring force of the spring 260 so as to form a hydraulic shim. Preferably, the spring force of spring 260 is approximately 30 Newton to 70 Newton.

The force vector (i.e. having a direction and magnitude) "$F_{out}$" of the first piston 220 moving towards the stack is defined as follows:

$$F_{out}=(F_{spring}\pm F_{seal246})*(A_{shim32}/A_{2ndReservoir34})\pm F_{seal214}$$

where:

$F_{out}$=Applied Force (To the Piezo Stack)

$F_{spring}$=Spring Force (30 to 70 N)

$A_{shim32}$=Area above piston (Hydraulic Shim or first fluid reservoir32)

$A_{2ndReservoir34}$=Area below the second piston (Second Fluid Reservoir34)

$F_{seal246}$=Seal Friction Force of seal 246

$F_{seal214}$=Seal Friction Force of seal 214.

Preferably, the spring 260 is a coil spring. Here, the pressure in the fluid is related to at least one spring characteristic of the coil spring. As used throughout this disclosure, the at least one spring characteristic can include, for example, the spring constant, spring free length, the amount of preload due to the threaded adjuster 13 and modulus of elasticity of the spring. Each of the spring characteristics can be selected in various combinations with other spring characteristic(s) noted above so as to achieve a desired response of the compensator assembly.

Referring again to FIG. 1, during operation of the fuel injector 100, fuel is introduced at fuel inlet 24 from a fuel supply (not shown). Fuel at fuel inlet 24 passes through a fuel filter 11, through a passageway 18, through a passageway 20, through a fuel tube 22, and out through a fuel outlet 62 when valve closure member 40 is moved to an open configuration.

In order for fuel to exit through fuel outlet 62, voltage is supplied to length-changing actuator stack 100, causing it to expand. The expansion of length-changing actuator stack 100 causes bottom 44 to push against valve closure member 40, allowing fuel to exit the fuel outlet 62. After fuel is injected through fuel outlet 62, the voltage supply to length-changing actuator stack 100 is terminated and valve closure member 40 is returned under the bias of spring 48 to close fuel outlet 62. Specifically, the length-changing actuator stack 100 contracts when the voltage supply is terminated, and the bias of the spring 48 which holds the valve closure end 42 in constant contact with bottom 44, also biases the valve closure member 40 to the closed configuration.

During engine operation, as the temperature in the engine rises, inlet fitting 12, injector housing 14 and valve body 16 experience thermal expansion due to the rise in temperature while the length-changing stack experience generally insignificant thermal expansion. At the same time, while the actuator 100 is not energized, fuel traveling through fuel tube 22 and out through fuel outlet 62 cools the internal components of fuel injector assembly 100 and causes thermal contraction of valve closure member 40.

Referring to FIG. 1, as valve closure member 40 contracts, bottom 44 tends to separate from its contact point with valve closure end 42. Length-changing actuator stack 100, which is operatively connected to the bottom surface of first piston 220, is initially pushed downward due to a pressurization of the fluid by the spring 260 acting on the second piston with a force $F_{out}$. The increase in temperature causes inlet fitting 12, injector housing 14 and valve body 16 to expand relative to the actuator stack 100 due to the generally higher volumetric thermal expansion coefficient β of the fuel injector components relative to that of the actuator stack. This movement of the first piston is transmitted to the actuator stack 100 by a top 46, which movement maintains the position of the bottom 44 of the stack constant relative to the closure end 42. It should be noted that in the preferred embodiments, the thermal coefficient β of the hydraulic fluid 36 is greater than the thermal coefficient β of the actuator stack. Here, the compensator assembly can be configured by at least selecting a hydraulic fluid with a desired coefficient β and selecting a predetermined volume of fluid in the first reservoir such that a difference in the expansion rate of the housing of the fuel injector and the actuator stack 100 can be compensated by the expansion of the hydraulic fluid 36 in the first reservoir.

When the actuator 100 is energized, pressure in the first reservoir 32 increases rapidly, causing the plate 270 to seal tight against the first spacer face 232. This blocks the hydraulic fluid 36 from flowing out of the first fluid reservoir to restrictor passage 237 and the passage 236. Because of the virtual incompressibility of fluid, the fluid 36 in the first reservoir 32 approximates a stiff reaction base, i.e. a shim, on which the actuator 100 can react against. The stiffness of the shim is believed to be due in part to the virtual incompressibility of the fluid and the blockage of flow out of the first reservoir 32 by the plate 270. Here, when the actuator stack 100 is actuated in an unloaded condition, it extends by approximately 60 microns. As installed in a preferred embodiment, one-half of the quantity of extension (approximately 30 microns) is absorbed by various components in the fuel injector. The remaining one-half of the total extension of the stack 100 (approximately 30 microns) is used to deflect the closure member 40. Thus, a deflection of the actuator stack 100 is believed to remain constant as it is energized time after time, thereby allowing an opening of the fuel injector to remain the same.

When the actuator 100 is not energized, fluid 36 flows between the first fluid reservoir and the second fluid reservoir while maintaining the same preload force $F_{out}$. The force $F_{out}$ is a function of the spring 260, the friction force due to the seals 214, 246 and the surface area of each piston. Thus, it is believed that the bottom 44 of the actuator stack 100 is maintained in constant contact with the contact surface of valve closure end 42 regardless of expansion or contraction of the fuel injector components.

Although the compensator assembly 200 has been shown in combination with a length-changing actuator for a fuel injector, it should be understood that any length changing actuator, such as, for example, an electrorestrictive, magnetorestrictive or a solid-state actuator, could be used with the compensator assembly 200. Here, the length changing actuator can also involve a normally deenergized actuator whose length is expanded when the actuator energized. Conversely, the length-changing actuator is also applicable to where the actuator is normally energized and is de-energized so as to cause a contraction (instead of an expansion) in length. Moreover, it should be emphasized that the compensator assembly 200 and the length-changing solid state actuator are not limited to applications involving fuel injectors, but can be for other applications requiring a suitably precise actuator, such as, to name a few, switches, optical read/write actuator or medical fluid delivery devices.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A method of compensating for distortion of a fuel injector, the fuel injector including a housing having a first housing end and a second housing end extending along a longitudinal axis, a length-changing solid state actuator disposed along the longitudinal axis, a closure member coupled to the solid state actuator, and a compensator assembly that moves the length-changing actuator with respect to the housing in response to temperature changes, the compensator assembly including a body having a first body end and a second body end extending along a longitudinal axis, the body having a body inner surface facing the longitudinal axis, a spacer disposed between the first piston and the second piston in the body, the spacer having a first spacer end and a second spacer end in fluid communication with one another, the first spacer end being disposed in a confronting arrangement to one of the first face and second face so as to define a first fluid reservoir within the body, the second spacer end being disposed in a confronting arrangement to the other of the first face and the second face so as to define a second fluid reservoir within the body, and a valve disposed in one of the first and second reservoir, the valve being responsive to one of a first fluid pressure in the first fluid reservoir and a second fluid pressure in the second reservoir so as to permit fluid flow, the method comprising:

containing a predetermined amount of hydraulic fluid in the first and second fluid reservoirs;

pressurizing the hydraulic fluid in at least one of the first and second fluid reservoirs so as to displace the first piston; and preventing communication of hydraulic fluid between the first and second fluid reservoirs during activation of the length changing actuator so as to capture a volume of hydraulic fluid in one of the first and second fluid reservoirs.

2. The method of claim 1, wherein the pressurizing further comprises moving the length-changing actuator relative to the housing in a first direction along the longitudinal axis when the temperature is above a predetermined temperature.

3. The method of claim 2, wherein the preventing further comprises releasing a portion of the hydraulic fluid in the one fluid reservoir so as to maintain a position of the closure member and a portion of the length changing actuator constant relative to each other when the length changing actuator is not energized.

4. A fuel injector, the fuel injector comprising:

a housing having a first housing end and a second housing end extending along a longitudinal axis, the housing having an end member disposed between the first and second housing ends;

a length-changing solid-state actuator disposed along the longitudinal axis;

a closure member coupled to the length-changing actuator, the closure member being movable between a first configuration permitting fuel injection and a second configuration preventing fuel injection; and a compensator assembly that moves the length-changing actuator with respect to the housing in response to temperature changes, the compensator assembly including:

a body, the body including an interior surface defining a first fluid reservoir and a second fluid reservoir that are disposed between a first body end and a second body end;

a valve spacer disposed between the first fluid reservoir and the second fluid reservoir, the valve spacer having a first spacer face and a second spacer face; and a plate contiguous to one of the first and second faces; the plate being responsive to one of a first fluid pressure in the first fluid reservoir and a second fluid pressure in the second reservoir so as to permit fluid flow from one of the first and second fluid reservoirs to the other of the first and second fluid reservoirs.

5. The fuel injector of claim 4, wherein the plate includes a plurality of orifices formed thereon, and the plate is exposed to the first fluid reservoir such that the plate projects over one of the first and second faces of the valve spacer and whose thickness is approximately 1/64 of the square root of the surface area of one side of the plate.

6. The fuel injector of claim 4, wherein the body further comprises:

a first piston disposed in the body proximate one of the first body end and second body end, the first piston including a first face having a first surface area;

a first sealing member coupled to the first piston and contiguous to the body inner surface; a second piston disposed in the body distal to the first piston, the second piston including a second face having a second surface area;

a second sealing member coupled to the second piston and contiguous to the body inner surface.

7. The fuel injector of claim 6, wherein the first sealing member comprises an O-ring disposed in a groove formed on a peripheral surface of the first piston such that the O-ring is contiguous to the body inner surface.

8. The fuel injector of claim 6, wherein the second sealing member comprises an O-ring disposed in a groove formed on a peripheral surface of the second piston such that the O-ring is contiguous to the body inner surface.

9. The fuel injector of claim 6, further comprising a fluid passage disposed in the spacer, the fluid passage being coupled to the valve so as to permit fluid communication between the first and second fluid reservoirs.

10. The fuel injector of claim 6, wherein the first piston comprises a first surface area in contact with the fluid and the second piston comprises a second surface area in contact with the fluid such that a resulting force on at least one of the first and second pistons is a function of the spring force, at least one seal friction force and a ratio of the first surface area to the second surface area.

11. A hydraulic compensator for an length-changing actuator, the length-changing actuator having first and second ends, the hydraulic compensator comprising:

a body having a first body end and a second body end extending along a longitudinal axis, the body having a body inner surface facing the longitudinal axis;

a first piston disposed in the body proximate one of the first body end and second body end, the first piston including a first face having a first surface area;

a first sealing member coupled to the first piston and contiguous to the body inner surface;

a second piston disposed in the body distal to the first piston, the second piston including a second face having a second surface area;

a second sealing member coupled to the second piston and contiguous to the body inner surface;

a spacer disposed between the first piston and the second piston in the body, the spacer having a first spacer end and a second spacer end in fluid communication with one another, the first spacer end being disposed in a confronting arrangement to one of the first face and second face so as to define a first fluid reservoir within the body, the second spacer end being disposed in a confronting arrangement to the other of the first face and the second face so as to define a second fluid reservoir within the body; and a valve disposed in one of the first and second reservoir, the valve being responsive to one of a first fluid pressure in the first fluid reservoir and a second fluid pressure in the second reservoir so as to permit fluid flow from one of the first and second fluid reservoirs to the other of the first and second fluid reservoirs.

12. The compensator of claim 11, wherein the valve comprises a plate the plate including a plurality of orifices disposed thereon, the plate being exposed to the first fluid reservoir such that the plate projects over one of the first and second faces of the valve spacer and whose thickness is approximately $1/64$ of the square root of the surface area of one side of the plate.

13. The compensator of claim 11, wherein the first sealing member comprises an O-ring disposed in a groove formed on a peripheral surface of the first piston such that the O-ring is contiguous to the body inner surface.

14. The compensator of claim 11, wherein the second sealing member comprises an O-ring disposed in a groove formed on a peripheral surface of the second piston such that the O-ring is contiguous to the body inner surface.

15. The compensator of claim 11, further comprising a fluid passage disposed in the spacer, the fluid passage being coupled to the valve so as to permit fluid communication between the first and second fluid reservoirs.

16. The compensator of claim 11, wherein the first piston comprises a first surface area in contact with the fluid and the second piston comprises a second surface area in contact with the fluid such that a resulting force on at least one of the first and second pistons is a function of the spring force, at least one of a seal friction force and a ratio of the first surface area to the second surface area.

* * * * *